US008296192B2

(12) United States Patent
Bullock (10) Patent No.: US 8,296,192 B2
(45) Date of Patent: *Oct. 23, 2012

(54) METHOD FOR MAKING MONEY ON THE INTERNET (76) Inventor: Roddy McKee Bullock, Milford, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/295,088

(22) Filed: Nov. 13, 2011

(65) Prior Publication Data

US 2012/0109766 A1 May 3, 2012

Related U.S. Application Data (63) Continuation of application No. 12/479,780, filed on Jun. 6, 2009, now Pat. No. 8,065,193.

(51) Int. Cl.
*G06Q 30/00* (2006.01)
*G06F 17/30* (2006.01)
(52) U.S. Cl. ............... 705/26.3; 705/26.1; 705/27.1
(58) Field of Classification Search ......... 705/26.1–27.2
See application file for complete search history.

(56) References Cited

U.S. PATENT DOCUMENTS

| 5,677,955 A | 10/1997 | Doggett et al. |
| 5,960,411 A | 9/1999 | Hartman et al. |
| 6,330,550 B1 | 12/2001 | Brisebois et al. |
| 6,957,334 B1 | 10/2005 | Goldstein et al. |
| 7,089,208 B1 | 8/2006 | Levchin et al. |
| 7,139,732 B1 | 11/2006 | Desenberg |
| 7,209,970 B1 | 4/2007 | Everson et al. |
| 7,272,728 B2 | 9/2007 | Pierson et al. |
| 7,275,685 B2 | 10/2007 | Gray et al. |
| 7,620,636 B2 | 11/2009 | Fasciano |
| 2002/0147690 A1 | 10/2002 | Tam et al. |
| 2003/0004806 A1 | 1/2003 | Vaitekunas |
| 2003/0130900 A1 | 7/2003 | Telford et al. |
| 2005/0015445 A1 | 1/2005 | Chudnovsky et al. |
| 2005/0044014 A1 | 2/2005 | Tilis et al. |

(Continued)

FOREIGN PATENT DOCUMENTS

WO  WO 99/13424 A1  3/1999

OTHER PUBLICATIONS

Office Action and Forms 1449 in related case U.S. Appl. No. 12/479,780, including prior art made of record.

(Continued)

*Primary Examiner* — William Allen
*Assistant Examiner* — Kathleen G Palavecino (57) ABSTRACT

A computer-implemented system for monetizing internet content. The system includes an internet content provider providing online information on a web page and an online comment section associated with said online information, said online comment section capable of having posted thereto reader comments in a free default format. The system includes computer executable instructions for performing steps of displaying an offer associated with said online information to alter a reader comment from a free default format to a distinctive format for a fee, said fee being dynamically adjustable; receiving by the internet content provider; and displaying the reader comment in the distinctive format on the web page. The system also includes a processor for executing the computer executable instructions, and a memory for storing at least the computer executable instructions.

8 Claims, 2 Drawing Sheets

U.S. PATENT DOCUMENTS

| | | |
|---|---|---|
| 2005/0273503 A1 | 12/2005 | Carr et al. |
| 2005/0278542 A1 | 12/2005 | Pierson et al. |
| 2006/0253340 A1 | 11/2006 | Levchin et al. |
| 2006/0271438 A1 | 11/2006 | Shotland et al. |
| 2007/0038646 A1 | 2/2007 | Thota |
| 2007/0170245 A1 | 7/2007 | Elbaum et al. |
| 2008/0005282 A1 | 1/2008 | Gaedcke |
| 2008/0016164 A1 | 1/2008 | Chandra |
| 2008/0082381 A1 | 4/2008 | Muller et al. |
| 2008/0109363 A1 | 5/2008 | Fassett |
| 2008/0133488 A1 | 6/2008 | Bandaru et al. |
| 2008/0319873 A1 | 12/2008 | Levchin et al. |
| 2008/0319874 A1 | 12/2008 | Levchin et al. |
| 2008/0319875 A1 | 12/2008 | Levchin et al. |
| 2008/0319899 A1 | 12/2008 | Levchin et al. |
| 2009/0083383 A1 | 3/2009 | Piper et al. |
| 2010/0138294 A1 | 6/2010 | Bussmann et al. |

OTHER PUBLICATIONS

Office Action and Forms 1449 in related case U.S. Appl. No. 12/574,679 including prior art made of record.

Abechtel1, Would you pay to comment on a news site?, The Editor's Desk, Mar. 30, 2009, http://editdesk.wordpress.com/2009/03/30comments-pay/.

Na, So you want to become a new member . . . , MetalFilter, Dec. 8, 2009 (may be date accessed), http://www.metafilter.com/newuser.mefi.

John Robinson, Penny for your thoughts?, The Editor's Log, Mar. 5, 2009, http://www.news-record.com/blog/56184/entry/58159.

TalkAhead Sponsored Comments: Starting Conversations between Consumers and Marketers.

http://www.talkahead.com/.

Forms 1449 in newly filed related case U.S. Appl. No. 13/481,825.

Forms 1449 in newly filed related case U.S. Appl. No. 13/531,581.

METHOD FOR MAKING MONEY ON THE INTERNET

This application is a continuation of U.S. patent application Ser. No. 12/479,780 filed Jun. 6, 2009, now U.S. Pat. No. 8,065,193, entitled "Method for Making Money on the Internet".

FIELD OF THE INVENTION

This invention relates to a method for generating revenue on the internet, and more specifically to making money from readers of news sites and blogs.

BACKGROUND OF THE INVENTION

The internet is the main source of news and information for growing numbers of people. Mainstream media news organizations, niche news outlets, and alternative viewpoint news sources all maintain news content on websites. In addition to news, the internet has fostered the growth and popularity of "web logs" or "blogs" run by "bloggers" as sources of news and information.

One problem with the internet as a source of news and information is that it is difficult for news organizations or bloggers to generate revenue. Popular sites can attract paying advertisers, but in the current internet environment the sheer number of websites offering news and information makes the pool of advertising dollars insufficient to bring in satisfying revenue for many. Additionally, some websites or blogs have very loyal, but very limited readership, so that the size of the reading audience makes the website unattractive to advertisers.

There is a continuing unmet need for a method for internet content providers, such as organizations with websites, individuals or groups with blogs, and syndicated news organizations to generate revenue, or additional revenue, for the content provided to the public.

Many websites provide news and information content with a provision for the reader to leave comments. For example, a news story can include a place, usually at the end of the article, for the user to post his or her comments. Sometimes the user must first register, but other times the user simply leaves a comment pursuant to the instructions given. Likewise, many blogs provide the opportunity for readers to comment. Again, the person commenting may have to first register, but not always. Sometimes comments are moderated, which means they can be first checked for content before posting publicly on the website.

Popular or controversial news stories or blog entries can generate many hundreds of comments. Comments are usually posted in chronological order, and can be ranked or emailed by readers. Sometimes comments are posted in non-chronological order, such as by "most popular" or "most emailed". Sometimes the comment section is set up to allow comments on comments, with those readers submitting comments, i.e., commenters, often generating a line of thought that can be independent of the original story.

A reader of a news story or blog often checks the comments, but may not read down more than a few comments, and may read only the first and last comments. Many comments go unread for lack of visibility, that is, they are in essence "buried" in the multitude of other comments. Many readers and commenters (i.e., readers who leave comments) alike can find the lack of attention to particular comments to be frustrating. For example, a reader who wishes to leave what the reader perceives to be a particularly salient comment may be frustrated by the knowledge that her comment might be in the middle of hundreds of others, thereby making it highly unlikely to be read by anyone.

There is a continuing unmet need for a way to permit commenters on news stories or blog entries to get their comments noticed.

SUMMARY OF THE INVENTION

A computer-implemented system for monetizing internet content is disclosed. In an embodiment, the system includes an internet content provider providing online information on a web page and an online comment section associated with said online information, said online comment section capable of having posted thereto reader comments in a free default format. The system also includes computer executable instructions for performing steps of displaying an offer associated with said online information to a reader, said offer being an offer to alter a reader comment from said free default format to a distinctive format for a fee, said fee being dynamically adjustable; providing to said reader a preview of said distinctive format comment; receiving by said internet content provider or a third party charged with receiving fees for said internet content provider payment of said fee; and displaying said reader comment in said distinctive format on said web page. The system also includes a processor for executing said computer executable instructions, and a memory for storing at least said computer executable instructions.

DETAILED DESCRIPTION OF THE INVENTION

The method of the present invention has as an object the making of money using the internet. As used herein the term internet is used in its normal usage to be the system, including the World Wide Web by which content providers, such as news sites, can supply web content, such as from a news server, to be displayed, or published, on internet connected client (or reader) computers operable to access and display the content via a web browser. Therefore, computers, networks, internet connections, operating systems, programs, data structures, processing units, system memory components, system busses, wireless connections, cookies, and other computing hardware and software as known in the art for internet communication can be utilized in the present invention. By way of further example, a computer and computing environment suitable for practicing the present invention is described in U.S. Ser. No. 11/197,067, published Feb. 15, 2007 as US 2007/0038646, entitled Ranking Blog Content, and particularly paragraphs [0083] to [0102] and FIGS. 11 and 12. Thus, without being bound by theory, or limited by lack of precise jargon, the description of the invention below is intended to be understood as being operable in the context of known means for operating websites, payment systems, computers, servers, and user-generated content, all as currently used for internet activity, but lacking in the inventive features of the present invention.

In the following description, for purposes of explanation, numerous specific details are set forth in order to provide a thorough understanding of the subject invention. It may be evident, however, that the invention can be practiced without some of these specific details.

The method of the invention allows willing readers to pay a fee for having posted comments to an online publication of an internet content provider rendered distinctive, the distinctive comments being altered from a default comment format so that the altered comments are distinctive relative to a default format. Readers can comment on a news story or blog entry, and the like, whether or not they read the online publication to which comments are associated. Readers can also be people who wish to alter for distinctiveness a comment of another. In this manner, readers desiring that the reading public read their comment, or the comment of another, can, by paying a fee to the internet content provider or a third party on behalf of the internet content provider, have a comment visibly changed in its online published format so as to make it stand out from the comments posted in a free default format.

"Internet content provider" as used herein refers to individuals, organizations, corporations, or other entities that publish content on the internet for reading by those connected to the internet via web browsers operating on computers. Thus, for example, CNN is an internet content provider, providing news stories via the URL www.cnn.com to readers who enter the URL into the web browser on their personal computers. Similarly, The Huffington Post is an internet content provider, providing commentary in the form of a web log, or "blog" via the URL www.thehuffingtonpost.com to readers who enter the URL into the web browser on their personal computers. Readers can subscribe to internet content providers via syndication feeds, and individual URLs can be stored via browser "bookmark" or "favorites" utilities.

"Comment" or "comments" as used herein refers, in context, to the expression of the thoughts and/or opinion that a reader writes and/or posts in commentary, letters, and the like, for publication in the section of an internet content provider's web content that is intended for reader comments. The expression can take the form of text, as in letters, words and sentences, images, as in digital photos and videos, sounds, as in audio recordings, graphical descriptions, advertising, URL links, and combinations thereof. "Comments" or "comment section" also refers, in context, to the portion of a section of an internet content provider's website intended to contain the expression of readers' posted thoughts and/or opinion.

In prior art comment sections, the appearance or placement (relative to other comments and/or relative to the web page on which they appear) of the comment as publicly posted was not in the commenter's control. After submitting the comment it would show up posted in a default format utilized by the website or content provider, including, usually, in a chronological order. In some instances, the internet content provider permits certain html-code commands, and other limited textual commands to render text as bold, italics, and the like, all of which is not considered to be modified or altered to be conspicuous or distinctive within the scope of the present invention.

"Default format" as used herein with respect to the format of the comment section of an internet providers' story or blog entry, refers to a typical or standard format for comments utilized by a news site or a blog for which no fee is received, and which format can be modified or altered by payment of a fee as disclosed herein.

"Commenter" as used herein is one who makes, leaves, or posts a comment on a page of an internet content provider. "Reader" when used in context of one who wishes to leave a comment is synonymous with commenter.

In one embodiment, the internet content provider can be a news organization, providing news stories. In another embodiment, the internet content provider can be a blogger, providing opinion and other information, including news, on a blog. In either embodiment, whether it be a news story, a blog entry, or other information, the internet content provider can make provision for readers to leave an online comment, with an added provision of facilitating or permitting payment of a fee in exchange for having the reader's comment rendered more conspicuous and distinctive by altering or modifying it relative to a free default format, and/or by placing it in a distinctive position on a web page relative to other comments which may or may not be in a free default format.

In one embodiment, a news story or blog entry can have associated therewith, for example, at the end thereof, a section for readers to leave comments. Such comment sections and reader-generated comments are currently used by online content providers, and comments can include messages, URL addresses, video links, quoted material, letters, letters to the editor, and the like. Such comments are currently known to be posted in a default format for free, either with or without first registering, and either with or without moderation of the comment.

The present invention provides for a solution to a website's problem of lack of sufficient revenue, and at the same time, indulges a reader's desire to have his or her comment made more prominent, by providing for a fee payment from the reader to the internet content provider, or a predetermined third party handling the internet provider's financial transaction, in exchange for the internet content provider posting the reader's comment in a distinctive manner. In one embodiment, after the reader types out a comment, the reader can be prompted by an on screen prompt to pay a fee in exchange for the reader's comment to be modified from the standard or default format used for free (i.e., cost free, no fee paid by the reader) comments by making it distinctively different from other comments and/or placing it in a distinctive location or position relative to other comments. For example, for a fee, the internet content provider can keep a reader's comment as the first comment after a news story, regardless of the otherwise chronological timing of the posting.

In one embodiment, the reader can agree to pay a fee, and can pay the fee from a payment account via known methods of fee payment, such as by online credit card, online secure credit payment, or PAYPAL®. The reader's payment account can be a debit account or a checking account. The fee can be deposited into the internet content provider's receiving account, or a receiving account of a third party charged with receiving fees for the internet content provider. Any known online payment system can be used to allow the reader to pay a fee to the internet content provider or a predetermined third party. In one embodiment, for certain readers of a news site or blog, the internet content provider can set up, and the reader can subscribe to, a personal deposit account with money deposited therein by the reader from which the reader can instruct the news site or blog to deduct payment upon instruction by the reader to do so.

In one embodiment, in exchange for a fee paid by the reader, the reader's comment, letter, or the like can be posted in a condition altered from a free (no cost or fee) default format by use of a distinctive background, background color, border, border colors, text, text color, text font, text font size, and combinations thereof. For example, after paying a fee, the reader's comment, letter, photo, or the like can be displayed among the free default-format comments, with a distinctive background color, a distinctive border, larger font text, and combinations thereof. Similarly, after paying a fee, the reader's comment, letter, photo or the like can be posted in a different position or location relative to the free default-format comments. The different position or location can be a prominent, non-chronological placement with other comments, or a separate place on the web page with other comments, or on a separate web page.

In one embodiment, in exchange for a fee paid by the reader, the reader's comment can be altered from a free default format by allowing the user to customize the comment with the reader's choice of color, style, and/or size of various components of the comment.

In one embodiment, a specified distinctiveness, such as a distinctive appearance and/or position in a comments section or a distinctive appearance and/or position on a web page, can be auctioned off, similar to how items are auctioned on popular websites such as eBay®. For example, highly visible or otherwise well-placed comments, such as the first comment to appear after a news story or blog entry, or a separately displayed comment on a web page, can be auctioned to a highest bidder. In such an embodiment, a reader can place a bid for a specified position, such as the first comment to appear after a news story or blog entry, or any other designated spot. Upon placing the bid, the reader can be notified, either manually by a human website monitor, or automatically via software designed to handle bids such as that used by eBay® and the like, if he is the top bidder. Upon such notification, if he is not the high bidder, the reader can decide if he will raise (or "up") the bid so as to gain the desired spot, or take other action. If he is the high bidder, his comment will be posted in the bid-for distinctiveness. Additionally, the internet content provider can provide an option for the high bidder to be notified if another reader bids higher, thereby displacing his comment from its specified distinctiveness.

In one embodiment the internet content provider can guarantee a minimum or maximum time in a distinctive position for the fee received. Once the set time period expires, another reader can purchase the position for another set time period. In this manner, more than one reader can have his or her comment placed in a desirably distinctive position.

In one embodiment, a specified distinctiveness, such as a distinctive appearance and/or position in a comments section or a distinctive appearance and/or position on a web page, can be bid for, either by fixed price or by auction, for fixed time with a predetermined start time and stop time. In this manner, readers can bid for predictable timing of the exposure of their comments.

In one embodiment, a specified distinctiveness, such as a distinctive appearance and/or position in a comments section or a distinctive appearance and/or position on a web page, can be shared with other distinctive comments, such as in a special location on a web page, set apart from the free default-format comments.

In one embodiment the reader can bid for a desired spot, and if he or she is successful he or she can also put in a maximum bid to be automatically increased in predetermined increments if others bid for the same spot. Again, the basic concept is the same as, and can utilize all relevant software, executable programs, executable instructions, components, graphics, and algorithms of current online auction methods, such as the methods utilized by websites like eBay®. In this manner more than one reader can bid on any given desired position for posting a comment, with the criteria for successful posting simply being the highest bid. In one embodiment the internet content provider can set a predetermined time period in which bids are received, with the winning bid being rewarded the subject comment distinctiveness.

In one embodiment, the reader may desire to respond to another comment. In this case, the reader can be given the option of having the prior comment, to which he or she is responding, given the same distinctiveness of appearance and/or location as the reader's comment.

In one embodiment, another person other than the reader can pay a fee in exchange for having a comment made by another rendered distinctive. For example, a reader reading the comments made by others may read a comment in a free default format, which the reader would like to highlight for others by paying a fee in exchange for distinctiveness. In one embodiment, a commenter can be provided the means for ensuring that others cannot render their comment distinctive. For example, before leaving a comment to be posted in the comments section of a news story or blog entry, a commenter can be prompted to choose whether or not he or she would allow another person to change the appearance of the comment from the free default format to an altered distinctive format.

Therefore, the system and method of the present invention can be described as an internet-based system and method in which an internet content provider provides news or blog entry content on a website, for example, directly or via a server as is known in the art, or via any other manner known in the art. The internet content can be accessed by a person having an internet connection from a remote computer, such as a home computer connected via a service provider to the internet. For example, the internet content provider can be CNN.com, Foxnews.com, Yahoo.com, Salon.com, and the like, and the service provider can be Time Warner ROADRUNNER®, AOL, and the like. In general, the internet content provider and connected computer users utilize digital computer means to publish and access content via the internet, such as the World Wide Web, and can implement the content and other web-based activities by means of a processor for executing computer executable instructions and a memory for storing at least the computer executable instructions. The computers, processors, and memory can be any of known devices as is known in the art for implementing internet-based information content and user-configured online transactions.

In the present invention, in addition to permitting comments to be posted in a free default format, computer executable instructions of the system can prompt the reader to choose, such as by clicking or double clicking on a designated radio button, hyperlink, or other link, to pay a fee in exchange for the reader's comment, or comment chosen by a reader, being modified for distinctiveness relative to the free default format. The reader can be prompted at the time of making a comment, or the reader can be provided a link to elect to pay for distinctiveness of a previously posted comment.

Prior to paying a fee, or after electing to pay a fee, computer executable instructions of the system can provide one or more options for the reader or other user from which to choose. The internet content provider can provide one or more templates having pre-selected color and font schemes. The internet provider can provide an a la carte selection of various colors, borders, fonts, and the like so that the reader can choose his or her own attributes of distinctiveness. The internet content provider can provide a preview of the comment so that the reader can see what it will look like in the context of other comments before choosing to complete the transaction and have the altered, distinctive comment posted.

In one embodiment the fee required for a distinctive comment can be dynamically adjustable, and can be determined by conditions set by the internet content provider. For example, a base fee for a distinctive comment can be set to be a nominal cost of Y dollars. However, if many people are purchasing distinctiveness, it may be that "distinctive" is not so distinctive, so the internet content provider can raise the fee Z=>Y dollars, thereby letting market conditions moderate how many distinctive comments are in a particular thread of comments. For example, the fee can be governed by an algorithm programmed into the computer executable instructions that adjusts the fee based on the percentage of distinctive format comments relative to the total free default format comments in a particular thread. When the percentage reaches a set figure, the fee can be raised accordingly. Likewise, if the percentage lowers below a set figure, the fee can be lowered to attract more paid comments.

In an embodiment incorporating a dynamically adjustable fee, the comment distinctiveness can be an altered appearance relative to a free default format, but the comments can be otherwise posted in chronological order. The algorithm that governs the dynamically adjustable fee can take into account the number of consecutive distinctive comments, such that upon a set number, such as three, the fee can increase such that the distinctive comments do not become indistinct due to relatively close proximity to other distinct comments.

By having a dynamically adjustable fee, an internet content provider can generate increased revenue above that which a flat fee might generate. Particularly controversial news or blog entries, for example, can generate many heated and emotional responses, such that the value to a reader for posting a distinctive comment can be greater, and with more interest in being distinctive, the internet content provider can enjoy greater revenue with increasing fees for distinctive posts.

Once the reader chooses to pay a fee, or after a reader wins the bidding for an auctioned distinctiveness, computer executable instruction can facilitate that the fee be paid via any of known internet fee-payment methods, including by credit card transaction, debit card transaction, checking account transaction, and fee paying services such as PayPal®. The fee can be paid from a payment account of the reader, such as a credit card account, a debit card account, a checking account, or a PayPal® account. The fee can be received in a receiving account, which can be a bank account of the internet content provider, or a third party entrusted with handling the financial transaction for the internet content provider. The computer executable instruction can generate for the reader confirmation of fee payment on screen, or via an email receipt, and the on screen information can provide the commenter any other information deemed necessary by the internet content provider.

In one embodiment, a distinctive comment can be auctioned to a highest bidder. In one embodiment, computer executable instructions display to a reader an offer for particular distinctiveness, and receive bids from readers, who communicate their desire by responding to the onscreen instructions to do so. The computer executable instructions can set a time period in which multiple bids can be received, and the highest bid can win the auctioned distinctive comment once and for all. Or the computer executable instructions can place a highest bidder comment in predetermined place of particular distinctiveness only for the time before and until there is a higher bid for the same particular distinctiveness. For example, a news internet content provider can supply a news article to be displayed on an internet connected reader's computer operable to display the article, for example in a web browser. The news article can have at the end thereof displayed a comments section, and at least one position for one or more comments of particular distinctiveness reserved for a highest bidder. At Time 1, Reader 1 can bid N dollars and be the high bidder, thereby having his comment displayed with distinctiveness reserved for the high bidder. But, if at Time 2 Reader 2 bids and pays an amount greater than N dollars, then Reader 2's comment replaces Reader 1's, or is placed in a position more distinctive than Reader 1's. In one embodiment, Reader 1 can then receive a notification, for example via email, that he is no longer the highest bidder, and provided an opportunity to bid again. In another embodiment, Reader 1 can set a maximum bid to be increased automatically in increments sufficient to outbid subsequent bidders, up to a maximum amount specified, thereby remaining in the distinctive position until the maximum bid amount is surpassed by another bidder.

Figure 1:
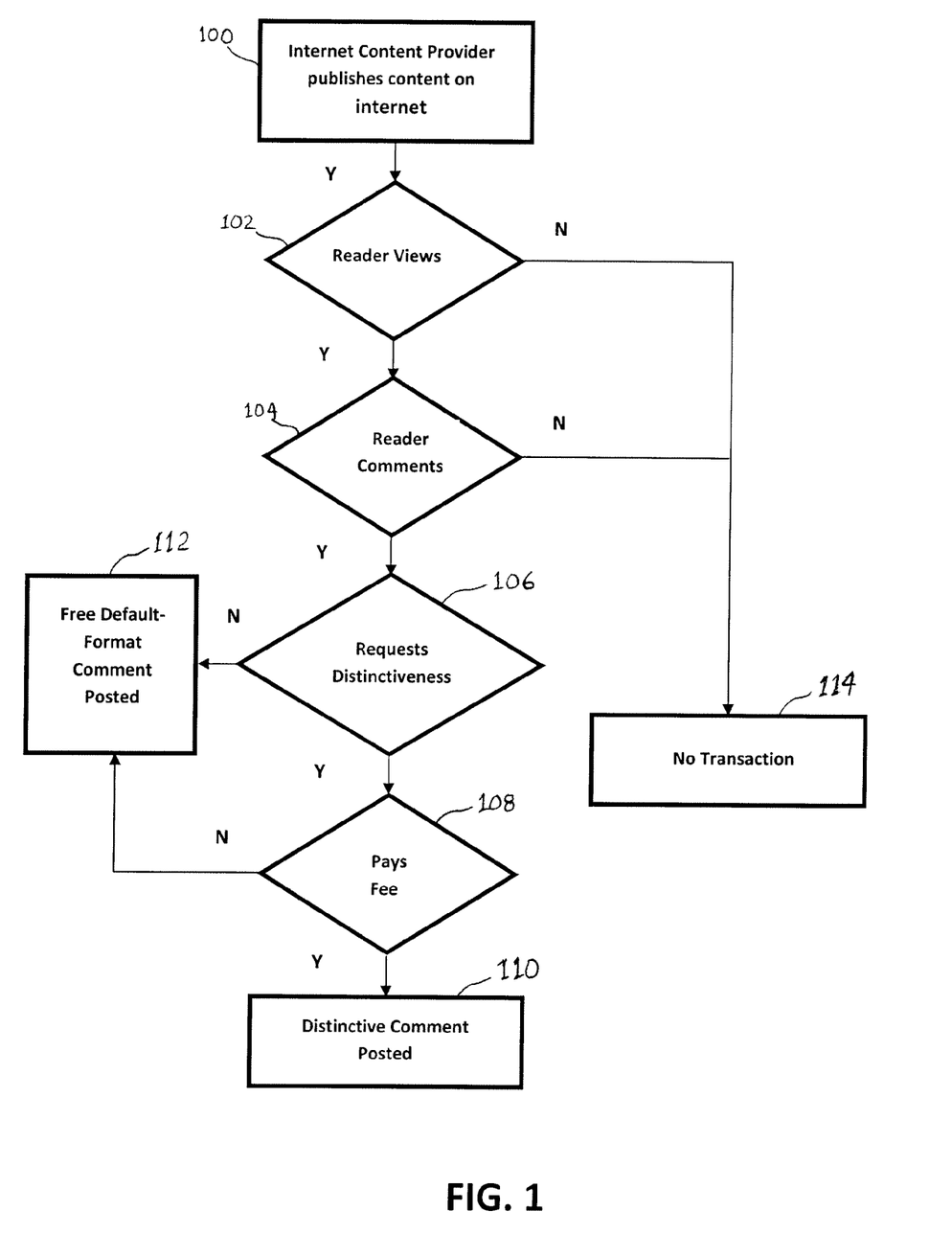
FIG. 1 is a flowchart description of one method of the present invention.

Referring to FIG. 1, one embodiment of a system and method for making money on the internet by providing for reader comment distinctiveness in exchange for a fee is shown. Generally, an internet content provider publishes content 100 on the internet, the content being accessible to readers by use of a computer having internet access and being connected via a web browser to the URL of the internet content provider. A reader views 102 the published internet content, which can be a news article, a blog entry, a video clip, and the like. The published internet content offers the reader the opportunity to leave comments, at least in a free default format or in a for-fee distinctive format. The distinctive format can be described by the internet content provider, including by examples of sample formats, positions, and the like. Leaving comments may require registration with the internet content provider, and may require approval by a moderator. The reader can choose to leave a comment 104, and decides whether to choose distinctiveness for his comment 106. If the reader does not view the internet content, or if the reader chooses not to leave a comment, there is no online transaction 114. If the reader chooses to pay for distinctiveness, the reader pays 108 via any known methods for executing a financial transaction over the internet, including by entry and processing from a reader's payment account, such as by use of a credit card or debit card, direct bank transfer, or PayPal®, to the internet content provider's payment receiving account (or a third party's receiving account, as arranged by the internet content provider). Once the reader's fee is processed, such that a payment is moved from a reader's payment account to the internet content provider's account, the reader's comment is posted in a distinctive format 110. If the reader does not wish to have her comment rendered distinctive, or if the reader does not pay a fee to do so, the reader's comment can be posted in the free default format 112.

Figure 2:
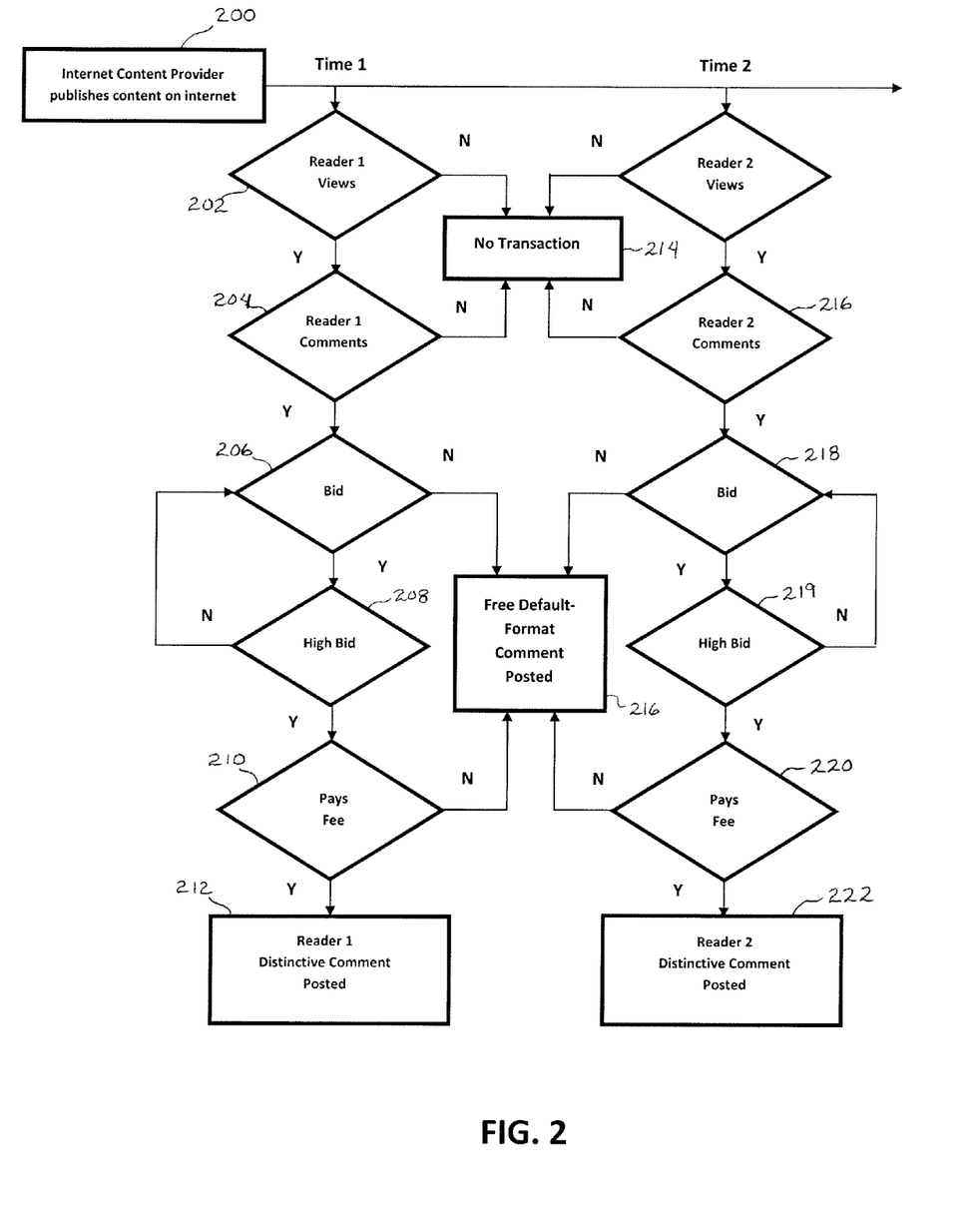
FIG. 2 is a flowchart description of one method of the present invention.

Referring to FIG. 2, one embodiment of a system and method for making money on the internet by providing for distinctiveness in exchange for a fee is shown. Generally, an internet content provider publishes content 200 on the internet, the content being accessible to readers by use of a computer having internet access and being connected via a web browser to the URL of the internet content provider. The published internet content offers readers the opportunity to post comments in at least in a free default format or readers can bid for a distinctive appearance and/or distinctive position of a posted comment. The distinctive appearance can be described by the internet content provider, including by examples of sample formats, positions, and the like. Leaving comments may require registration with the internet content provider, and may require approval by a moderator. At Time 1 a first reader, Reader 1, views 202 the published internet content, which can be a news article, a blog entry, a video clip, and the like. If Reader 1 chooses to not leave a comment, no transaction occurs 214. Reader 1 can choose to leave a comment 204, and decides whether to bid for distinctiveness for his comment 206. If the reader chooses to bid for distinctiveness, the reader bids 208 via known internet auction techniques, including those used by eBay®. If Reader 1 is not the highest bidder, Reader 1 can bid again 206. If Reader 1 is the highest bidder, Reader 1 can pay 210 the bid amount by any known methods for executing a financial transaction over the internet, including by entry and processing from Reader 1's payment account, such as by use of a credit card or debit card, direct bank transfer, or PayPal®, to the internet content provider's payment receiving account (or a third party's receiving account, as arranged by the internet content provider). Reader 1 can also, if provided for by the internet content provider, set a maximum bid and incremental amounts that he wishes the internet content provider to automatically raise his bid up to the maximum amount, in the event that a second reader wishes to out-bid Reader 1's current bid. Once Reader 1's fee is processed, such that a payment is made from Reader 1's payment account to the internet content provider's account, Reader 1's comment is posted in a distinctive format 212. If Reader 1 does not bid or does not pay the bid amount, Reader 1's comment can be posted in the free default format 216.

Further as shown in FIG. 2, a second reader, Reader 2 can read 218 the published content 200 at Time 2, and can choose to leave a comment 216, and decides whether to bid for distinctiveness for her comment 218, with this aspect of the invention requiring that Reader 2 must bid higher than at least Reader 1's winning bid 219, as well as, if used, Reader 1's stored maximum bid 220, which can be raised automatically in predetermined incremental amounts up to Reader 1's specified maximum. If Reader 2 chooses to not leave a comment, no transaction occurs 214. If Reader 2 bids but is not the highest bidder, Reader 2 can bid again 218. If Reader 2 is the highest bidder, Reader 2 can pay 220 the bid amount by any known methods for executing a financial transaction over the internet, including by entry and processing from Reader 2's payment account, such as by use of a credit card or debit card, direct bank transfer, or PayPal®, to the internet content provider's payment receiving account (or a third party's receiving account, as arranged by the internet content provider). Reader 2 can also, if provided for by the internet content provider, set a maximum bid and incremental amounts that she wishes the internet content provider to automatically raise her bid up to the maximum amount, in the event that a subsequent reader wishes to out-bid Reader 2's current bid. Once Reader 2's fee is processed, such that a payment is made from Reader 2's payment account to the internet content provider's account, Reader 2's comment is posted in a distinctive format 222, which can replace Reader 1's, or displace Reader 1's to a different position. If Reader 2 does not bid or does not pay the bid amount, Reader 2's comment can be posted in the free default format 216.

In one embodiment of the method of the present invention, the method can be as described above with respect to FIG. 2, but modified in that the internet content provider can allow for multiple "top" spots, such that a second, or third highest bidder can gain a particularly distinctive comment.

The method of the present invention can be implemented in conjunction with a promotion of the internet content provider. For example, the internet content provider can have a sweepstakes promotion, whereby readers who pay for comments can be entered into a sweepstakes for an award, such as an award for a "super-distinctive" comment, which can be a comment made uniquely distinctive for a time.

The method of the invention can be associated with a trademarked slogan, such as "Cop the Top Spot" and promoted conspicuously on the internet content providers web pages.

The method of the present invention can be implemented by having "dueling comments" whereby two opposing viewpoints can be displayed in appropriately disposed comment sections, whereby two paying readers can have their respective viewpoints displayed for readers to compare. For example, two sections for fee-paid distinctive comments can be displayed in side-by-side relationship, or in alternating chronological relationship.

The method of the present invention utilizes computers, wherein the term computers encompasses the whole of components such as processors, memory, servers, software, hardware, and the like, and wherein computers as such are machines for facilitating the method. Therefore, the method of the present invention can be described as machines transforming the subject matter of online reader comments. That is, the computer machines are utilized to transform the physical representation of the tangible expression of online comments, from one tangible output to a different tangible output, e.g., from a first default tangible expression of content to a second distinctive tangible expression of content.

The concept underlying the method of the present invention could be reapplied analogously to the print media of newspapers and magazines, with the system and method using online features and capabilities. A print magazine, such as Newsweek, could accept online submissions of letters to the editor for its newsstand print magazine, and could offer fee-based distinctiveness to readers who so desired. Readers who pay the associated fee could have their comments printed in the magazine made distinctive with respect to the free default comments.

While the invention has been described in detail, many other of various known features and methods, equipment, components, and techniques of online, internet-based systems and methods could be utilized with the present invention, such as reverse auction techniques, bid pooling, participant information gathering, use of virtual private networks (as distinct from a public internet), "one click" and "buy it now" features, dynamic and/or streaming pricing information, multiple participant transactional systems, secure information and data transmission, evolving dialog boxes, monitoring and notification of irregular network activity, prioritization of third party access to online sites, incentivizing comment reviews, and secure credit payment, to name some non-limiting examples. Therefore, the following patents and/or applications are hereby incorporated by reference herein, together with the above-mentioned U.S. Ser. No. 11/197,067, for their enabling teaching on various aspects and features of internet-based systems and methods, including those which could be incorporated to enhance the system and method of the present invention, but which for conciseness are not literally reproduced in full herein: U.S. Ser. No. 10/988,274, filed Nov. 11, 2004, entitled System and Method for Blog Functionality; U.S. Ser. No. 11/540,716, filed Oct. 2, 2006, entitled Method and Apparatus for Publishing Content Through Blog; U.S. Ser. No. 10/879,528, filed Jun. 30, 2004, entitled Content Publishing Over Mobile Networks; U.S. Ser. No. 11/443,436, filed May 30, 2006, entitled Providing Rewards for Manual User Insertion of One or More Ads into a Document to be Made Available to Another User or Users, for Distribution of Such Documents, and/or For User Actions on Such Distributed Ads; U.S. Ser. No. 11/420,970, filed May 30, 2006, entitled User Distributed Search Results; U.S. Ser. No. 11/464,813, filed Aug. 15, 2006, entitled System and Method for Conducting an Electronic Message Forum; U.S. Ser. No. 11/351,257, filed Feb. 9, 2006, entitled Facilitation of Online Discussion; U.S. Ser. No. 11/846,183, filed Aug. 28, 2007, entitled System and Method for Enhanced Interaction; U.S.

Ser. No. 11/925,964, filed Oct. 28, 2007, entitled Methods for Publishing Web Content; U.S. Ser. No. 11/604,949, filed Nov. 27, 2006, entitled System and Method for Peer-to-Peer Internet Communication; U.S. Ser. No. 10/988,274, filed Nov. 11, 2004, entitled System and Method for Blog Functionality; U.S. Ser. No. 11/086,501, filed Mar. 21, 2005, entitled System and Method for Notifying of the Posting of a Web Logging Message Via a Dispatch Communication; U.S. Pat. No. 6,202,051, filed Feb. 19, 1999, entitled Facilitating Internet Commerce Through Internetworked Auctions; U.S. Pat. No. 6,449,601, filed Dec. 30, 1998, entitled Distributed Live Auction; U.S. Pat. No. 7,024,376, filed Jun. 30, 2000, entitled Internet-based Auction Method; U.S. Pat. No. 6,665,649, filed Mar. 10, 2000, entitled Smooth End of Auction on the Internet; U.S. Pat. No. 6,044,363, filed Sep. 2, 1997, entitled Automatic Auction Method; U.S. Pat. No. 6,466,917, filed Mar. 9, 2000, entitled Method and Apparatus for Verifying the Identity of a Participant Within an On-line Auction Environment; U.S. Pat. No. 5,890,138, filed Mar. 30, 1999, entitled Computer Auction System; U.S. Pat. No. 5,835,896, filed Nov. 10, 1998, entitled Method and System for Processing and Transmitting Electronic Auction Information; U.S. Pat. No. 6,044,363, filed Mar. 28, 2000, Automatic Auction Method; U.S. Pat. No. 6,269,343, filed Jul. 31, 2001, entitled Online Marketing System and Method; U.S. Pat. No. 6,415, 270, filed Jul. 2, 2002, entitled Interactive Remote Auction Bidding System; U.S. Pat. No. 6,449,601, filed Sep. 10, 2002, entitled Distributed Live Auction; U.S. Pat. No. 6,587,838, filed Jul. 1, 2003, entitled Method and System for Conducting Real Time Electronic Commerce; U.S. Pat. No. 6,671,674, filed Dec. 30, 2003, entitled Computer-based Auction and Sale System; U.S. Pat. No. 7,024,376, filed Apr. 4, 2006, entitled Internet-based Auction Method; U.S. Pat. No. 7,085, 732, filed Aug. 1, 2006, entitled Online Trading for the Placement of Advertising Media; U.S. Pat. No. 7,162,446, filed Jan. 9, 2007, entitled Integrated Auction; U.S. Pat. No. 7,225, 151, filed May 29, 2007, entitled Online Auction Bid Management System and Method; U.S. Pat. No. 7,249,055, filed Jul. 24, 2007, entitled Method and System for Managing and Conducting a Network Auction; U.S. Pat. No. 7,249,085, filed Jul. 24, 2007, entitled Method and System for Conducting Electronic Auctions with Multi-Parameter Price Equalization Bidding; U.S. Pat. No. 7,315,832, filed Jan. 1, 2008, entitled Online Bidding System; U.S. Pat. No. 7,403,915, filed Jul. 22, 2008, entitled Auction System and Method; U.S. Pat. No. 7,089,208, filed Apr. 28, 2000, entitled System and Method for Electronically Exchanging Value Among Distributed Users; U.S. Pat. No. 7,191,151, filed Aug. 23, 2001, entitled Instant Availability of Electronically Transferred Funds; U.S. Pat. No. 7,249,094, filed Feb. 26, 2001, entitled System and Method of Depicting On-Line Transactions; U.S. Pat. No. 7,430,537, filed Jul. 10, 2001, entitled System and Method for Verifying a Financial Instrument; U.S. Pat. No. 5,893,080, filed Apr. 6, 1999, entitled Disbursement System and Method; U.S. Pat. No. 5,963,647, filed Oct. 5, 1999, entitled Method and System for Transferring Funds from an Account to an Individual; U.S. Pat. No. 6,029,151, filed Feb. 22, 2000, entitled Method and System for Performing Electronic Money Transactions; U.S. Pat. No. 6,032,133, filed Feb. 29, 2000, entitled Electronic Bill Pay System; U.S. Pat. No. 6,223,168, filed Apr. 24, 2001, entitled Automatic Remittance Delivery System; U.S. Pat. No. 5,845,265, filed Nov. 7, 1995, entitled Consignment Nodes; U.S. Pat. No. 7,389,251, filed Oct. 21, 1999, entitled Computer-implemented Method for Managing Dynamic Pricing Information; U.S. Ser. No. 10/740,151, filed Dec. 17, 2003, entitled Consignment Nodes; U.S. Ser. No. 11/140,660, filed May 27, 2005, entitled Publication of Informational Messages to Software Applications in a Computing Environment; U.S. Ser. No. 11/888,784, filed Jul. 9, 2004, entitled Method and Apparatus for Securely Displaying and Communicating Trusted and Untrusted Internet Content; U.S. Pat. No. 6,058,417, filed Oct. 23, 1998, entitled, Information Presentation and Management in an Online Trading Environment; U.S. Pat. No. 6,466,917, filed Mar. 9, 2000, entitled, Method and Apparatus for Verifying the Identity of a Participant Within an On-Line Auction Environment; U.S. Pat. No. 7,139,916, filed Jun. 28, 2002, entitled Method and System for Monitoring User Interaction with a Computer; U.S. Pat. No. 7,305,469, filed Dec. 18, 2001, entitled Prioritization of Third Party Access to an Online Commerce Site; U.S. Pat. No. 7,369,505, filed Jun. 7, 2004, entitled, Method and System to Efficiently Manage Network Connection to Connect a Client and a Resource; U.S. Pat. No. 7,233,973, filed Mar. 28, 2005, entitled Evolving Interactive Dialog Box for an Internet Web Page; U.S. Pat. No. 6,944, 599, filed Sep. 13, 2000, entitled Monitoring and Automatic Notification of Irregular Activity in a Network-Based Transaction Facility; U.S. Pat. No. 7,373,312, filed Dec. 4, 2000, entitled Method and Apparatus for Facilitating User Registration in an On-Line Auction Environment; U.S. Pat. No. 6,606,608, filed Jul. 19, 1999, entitled Method and System for Providing a Discount at an Auction; U.S. Pat. No. 6,549,904, filed Jun. 25, 1999, entitled Auction Notification System; U.S. Pat. No. 7,428,496, filed Jan. 27, 2006, entitled Creating an Incentive to Author Useful Item Reviews; and U.S. Pat. No. 6,324,526, filed Nov. 27, 2001, entitled System and Method for Performing Secure Credit Card Purchases.

What is claimed is:

1. A computer-implemented system for monetizing internet content, the system comprising:
   a. an internet content provider providing online information on a web page and an online comment section associated with said online information, said online comment section capable of having posted thereto reader comments in a free default format;
   b. computer executable instructions for performing steps comprising:
      i. displaying to a reader, who can leave a reader comment in response to said online information, an offer associated with said online information, said offer being an offer to alter a reader comment from said free default format to a distinctive format for a fee, said fee being dynamically adjustable;
      ii. providing to said reader a preview of said distinctive format comment;
      iii. receiving by said internet content provider or a third party charged with receiving fees for said internet content provider payment of said fee;
      iv. displaying said reader comment in said distinctive format on said web page;
   c. a processor for executing said computer executable instructions; and
   d. a memory for storing at least said computer executable instructions.

2. The system of claim 1, wherein said internet content provider provides content via a website and said content is a news story or blog entry, and said comment section is disposed at the end of said news story or blog entry.

3. The system of claim 2, wherein said distinctive format is being a first comment in said online comment section.

4. The system of claim 2, wherein said distinctive format is being posted in a different position relative to said free default format comments.

5. The system of claim 1, wherein said distinctive format can be customized by said reader.

6. The system of claim 5, wherein said distinctive format can include a reader's choice of color or style.

7. The system of claim 1, wherein said reader comment takes the form of text, an image, a sound, graphical descriptions, advertising, URL links, and combinations thereof.

8. The system of claim 7, wherein said reader comment comprises advertising.

* * * * *